US012752924B2

(12) United States Patent
Gao et al.

(10) Patent No.: US 12,752,924 B2
(45) Date of Patent: Oct. 6, 2026

(54) POWER CONVERSION SYSTEM AND FLIGHT VEHICLE

(71) Applicant: HITACHI, LTD., Tokyo (JP)

(72) Inventors: Hangxian Gao, Tokyo (JP); Hiroshi Kamizuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 110 days.

(21) Appl. No.: 18/399,814

(22) Filed: Dec. 29, 2023

(65) Prior Publication Data

US 2024/0258930 A1 Aug. 1, 2024

(30) Foreign Application Priority Data

Jan. 26, 2023 (JP) ................................ 2023-010004

(51) Int. Cl.

| | |
|---|---|
| ***B64D 27/35*** | (2024.01) |
| ***G21F 3/00*** | (2006.01) |
| ***H01M 8/0289*** | (2016.01) |
| ***H02M 7/217*** | (2006.01) |
| ***H02M 7/537*** | (2006.01) |

(52) U.S. Cl.

CPC ............... *B64D 27/35* (2024.01); *G21F 3/00* (2013.01); *H01M 8/0289* (2013.01); *H02M 7/217* (2013.01); *H02M 7/537* (2013.01)

(58) Field of Classification Search

CPC .... B64D 27/35; B64D 27/355; B64D 27/357; B64D 37/00; B64D 27/02; B64D 27/33; B64D 27/34; B64D 33/00; B64D 35/00; G21F 3/00; H01M 8/0289; H02M 7/217; H02M 7/537; B64G 1/428; B64G 1/42; B64G 1/54

See application file for complete search history.

(56) References Cited

U.S. PATENT DOCUMENTS

| | | | |
|---|---|---|---|
| 5,106,035 | A | 4/1992 | Langford |
| 2020/0070960 | A1 | 3/2020 | Parker et al. |
| 2022/0178498 | A1 | 6/2022 | Sperrin et al. |
| 2022/0250762 | A1 | 8/2022 | Sperrin et al. |

(Continued)

FOREIGN PATENT DOCUMENTS

| | | | |
|---|---|---|---|
| CN | 110304259 A * | 10/2019 | ............. B64D 27/02 |
| DE | 102023104760 A1 * | 8/2024 | ............ H10W 42/20 |

(Continued)

OTHER PUBLICATIONS

Extended European Search Report received in corresponding European Application No. 23220636.7 dated Jun. 21, 2024.

(Continued)

*Primary Examiner* — Valentina Xavier

(74) *Attorney, Agent, or Firm* — MATTINGLY & MALUR, PC

(57) ABSTRACT

A power conversion system incorporated in a flight vehicle includes a power converter having a semiconductor element stored therein. An energy storage is disposed above the power converter in the vertical direction, the energy storage storing a solid or liquid energy source containing a neutron attenuating material. The power converter is provided with a movable mechanism that moves to shift in position according to a tilt of the flight vehicle. The movable mechanism includes slider rails and a slider movable unit.

9 Claims, 15 Drawing Sheets

(56) References Cited

U.S. PATENT DOCUMENTS

| | | | |
|---|---|---|---|
| 2022/0349527 | A1 | 11/2022 | Sperrin et al. |
| 2023/0060926 | A1 | 3/2023 | Sone et al. |
| 2023/0212005 | A1 | 7/2023 | Sperrin et al. |
| 2023/0322383 | A1 | 10/2023 | Yanagimoto |

FOREIGN PATENT DOCUMENTS

| | | | | | |
|---|---|---|---|---|---|
| JP | 2018-163957 | A | | 10/2018 | |
| JP | 2021-128924 | A | | 9/2021 | |
| JP | 2022-094198 | A | | 6/2022 | |
| KR | 10-2019-0096559 | A | | 8/2019 | |
| KR | 20190096559 | A | * | 8/2019 | ............. B64D 37/30 |
| WO | 2020/240198 | A1 | | 12/2020 | |
| WO | 2022/208274 | A2 | | 10/2022 | |

OTHER PUBLICATIONS

Japanese Office Action received in corresponding Japanese Application No. 2023-010004 dated Feb. 3, 2026.

* cited by examiner

POWER CONVERSION SYSTEM AND FLIGHT VEHICLE

CROSS-REFERENCE STATEMENT

The present application is based on, and claims priority from, Japanese Patent Application Number 2023-010004, filed Jan. 26, 2023, the disclosure of which is hereby incorporated by reference herein in its entirety.

BACKGROUND OF THE INVENTION

1. Field of the Invention

The present invention relates to a power conversion system and a flight vehicle.

2. Description of the Related Art

In recent years, as decarbonization consciousness is rising around the world, electrification of aircraft has been studied vigorously. For example, an electric aircraft generates a propulsive force by an electric motor and therefore must carry a power converter that supplies power to the electric motor. The power converter has a power device or a semiconductor element. When a power device or a semiconductor element operates with high voltage in a high altitude environment, there is a risk that the power device or the semiconductor element accidentally fails because of neutrons originating from cosmic rays (cosmic ray neutrons). Cosmic ray neutrons refer to neutrons resulting from a nuclear reaction that occurs when high-energy-carrying particles (cosmic rays) flying in space hit the earth's atmosphere. The earth is constantly bombarded with various particles falling from space. These particles cause a nuclear reaction when hitting the atomic nuclei of oxygen, nitrogen, etc., in the earth's atmosphere, thus producing numbers of particles, such as protons and neutrons. Neutrons generated in this manner are called cosmic ray neutrons. When reaching the earth's surface, cosmic ray neutrons travel through human bodies, buildings, etc., and further proceed into the ground. It is a known fact that cosmic ray neutrons colliding with a semiconductor inside an electronic device causes the semiconductor to fail. What is described above indicates a problem that an aircraft flying at a high altitude, in particular, undergoes the great influence of cosmic rays. For flight at a high altitude, therefore, improving a neutron beam tolerance dose of the power device or the semiconductor element is a challenge to clear. In addition, a power conversion system incorporated in an aircraft needs to be reduced in weight, too.

JP 2018-163957 A discloses a technique including an electronic device, a housing unit disposed above the electronic device, and cooling water that is housed in the housing to be located at a position overlapping the electronic device and that serves as a neutron beam absorbing material.

JP 2021-128924 A discloses a technique of preventing deterioration caused by a neutron beam by disposing a fuel cell in a hydrogen-covered unit filled with high-pressure hydrogen having a neutron beam absorbing effect.

SUMMARY OF THE INVENTION

However, the technique of JP 2018-163957 A needs a large amount of cooling water to achieve an effective neutron blocking effect. The technique of JP 2021-128924

A, on the other hand, requires a special structure that can be filled with high-pressure hydrogen.

The present invention solves the above-described conventional problems, and an object of the present invention is to provide a power conversion system and a flight vehicle that can protect a power converter from neutron beams, the power conversion system and the flight vehicle having a simple configuration.

The present invention provides a power conversion system incorporated in a flight vehicle. The power conversion system includes a module having a semiconductor element stored therein. In the power conversion system, an energy storage is disposed above the module in a vertical direction, the energy storage storing a solid or liquid energy source containing a neutron attenuating material.

The present invention can provide the power conversion system and the flight vehicle that can protect the power converter from neutron beams in a simple configuration.

DESCRIPTION OF THE PREFERRED EMBODIMENTS

Embodiments of the present invention will hereinafter be described in detail with reference to the drawings. It should be noted that the present invention is not limited to the embodiments described below and that various modifications and applications of the present invention are included in its scope, providing that such modifications and applications are within the technical concept of the present invention. An electric system of a flight vehicle according to all embodiments will first be described with reference to FIG. 1.

Figure 1:
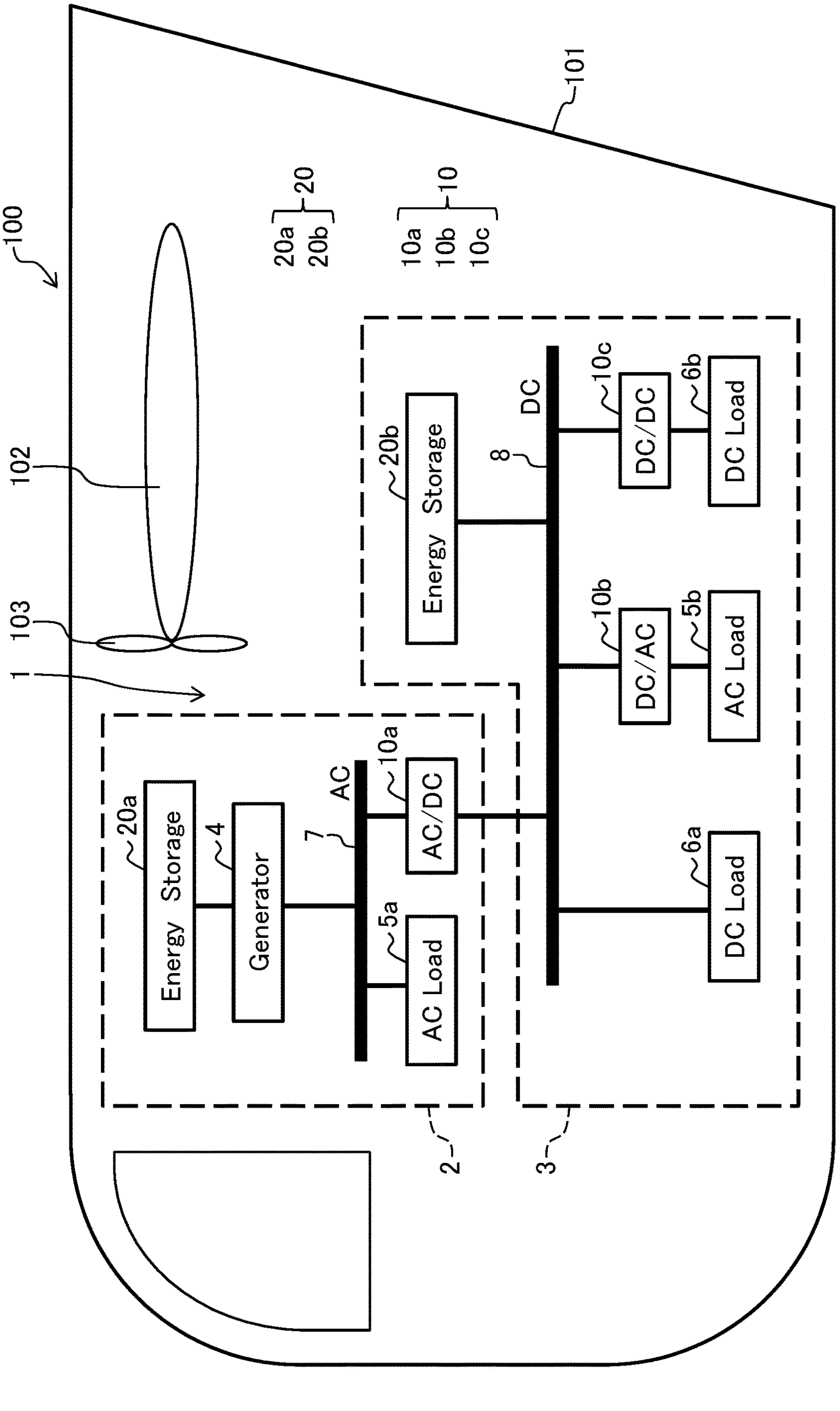
FIG. 1 is a schematic diagram of an electric system incorporated in a flight vehicle according to an embodiment.

FIG. 1 is a schematic diagram of an electric system incorporated in a flight vehicle according to an embodiment.

As shown in FIG. 1, an electric system 1 is incorporated in a flight vehicle 100 (aircraft, flying object). The flight vehicle 100 is, for example, a flight vehicle 100 equipped with an electric propeller, and includes a fuselage 101 (main body) accommodating passengers including a pilot, wings 102 extending from the fuselage 101, and propellers 103 (propulsion devices) disposed on the wings 102 and generating thrust with which the fuselage 101 flies.

The electric system 1 includes an AC electric section 2, which is an alternate current (AC) section, and a DC electric section 3, which is a direct current (DC) section. The AC electric section 2 includes an energy storage 20*a*, a generator 4, an AC bus bar 7, an AC load 5*a*, and an AC/DC power converter 10*a* (module). The DC electric section 3 includes an energy storage 20*b*, a DC bus bar 8, a DC/AC power converter 10*b* (module), a DC/DC power converter 10*c* (module), an AC load 5*b*, and DC loads 6*a* and 6*b*. The AC electric section 2 and the DC electric section 3 are connected via the AC/DC power converter 10*a*. In the following, the electric system 1 of a hybrid electric aircraft including the AC electric section 2 and the DC electric section 3 will be described. The electric system 1, however, may also be used as an electric system of a fully electrified aircraft (flight vehicle) dispensing with the AC electric section 2 or be applied to an aircraft (flight vehicle) dispensing with the DC electric section 3.

In the AC electric section 2, the generator 4 is connected to the energy storage 20*a*. The AC bus bar 7 is connected to the generator 4. Both the AC load 5*a* and the AC/DC power converter 10*a* are connected to the AC bus bar 7.

The generator 4 generates power by using energy accumulated in the energy storage 20*a*. This generator is a DC generator or an AC generator. In the case of the generator being a DC generator, the generator converts generated DC power into AC power and supplies it to the AC bus bar 7. The AC load 5*a* and the AC/DC power converter 10*a* acquire AC power they need, from the AC bus bar 7. The AC load 5*a* of the AC electric section 2 is, for example, a motor that rotates the propellers 103 of the flight vehicle 100.

The energy storage 20*a* is a fuel tank that stores energy therein. This fuel tank is disposed, for example, in the wing 102 of the flight vehicle 100 or near the center of the fuselage 101. Stored energy is, for example, a jet fuel composed mainly of kerosene, which is a fractionation component of petroleum. The jet fuel is supplied to a gas turbine engine (not shown), and the generator 4 (a generator as a rotating electrical machine) connected to the gas turbine engine generates power. AC power generated by the generator 4 is supplied to the AC load 5*a* and the AC/DC power converter 10*a* via the AC bus bar 7 to allow the AC load 5*a* and AC/DC power converter 10*a* to use AC power.

The energy stored in the fuel tank, i.e., the energy storage 20 may be a liquid fuel or solid fuel composed mainly of hydrogen. The liquid fuel is, for example, liquid hydrogen (liquefied hydrogen). The solid fuel is, for example, a hydrogen storage alloy capable of occluding hydrogen. This hydrogen storage alloy occludes hydrogen at a lower temperature (at a higher pressure) and releases hydrogen at a higher temperature (at a lower pressure). The liquid fuel or the solid fuel is supplied to the gas turbine engine (not shown) that runs on hydrogen, which allows the generator 4 to generate power. Such jet fuel, liquid fuel, and solid fuel each contain a large amount of hydrogen molecules effective for neutron beam absorption.

In the DC electric section 3, the energy storage 20*b* is connected to the DC bus bar 8. The DC load 6*a* is directly connected to the DC bus bar 8. The AC load 5*b* is connected to the DC bus bar 8 via the DC/AC power converter 10*b*. Similarly, the DC load 6*b* is connected to the DC bus bar 8 via the DC/DC power converter 10*c*.

The energy storage 20*b* is a component that stores energy, and is provided as, for example, a storage battery (battery), which is typically a lithium ion battery. The electrode or the electrolytic solution of the storage battery (battery) contains a large amount of atoms having a high neutron beam absorbing effect, such as lithium atoms and boron atoms.

The energy storage 20*b* may be a fuel cell or a fuel tank holding a liquid fuel (liquid hydrogen) or solid fuel (hydrogen storage alloy) composed mainly of hydrogen. The fuel cell generates power (DC power) as a result of a reaction between hydrogen and oxygen in the air. The fuel in the fuel tank and the fuel cell that is generating power can reduce the intensity of neutron beams by hydrogen.

Power generated by such an energy source stored in the energy storage 20*b* is supplied to the AC load 5*b* and to the DC loads 6*a* and 6*b*. The AC load 5*b* and the DC loads 6*a* and 6*b* are a motor that rotates the propellers 103 (see FIG. 1), a power device necessary for propulsion, an electric heating device like a heater, an illumination device, an alarm, a controller, and the like.

The energy storage 20*b* converts stored energy into DC power and supplies it to the DC bus bar 8 or supplies stored energy directly to the DC bus bar 8. The DC load 6*a* acquires DC power it needs, directly from the DC bus bar 8. The DC load 6*b* acquires power it needs, from the DC bus bar 8 via the DC power converter 10*c*. The AC load 5*b* acquires power it needs, from the DC bus bar 8 via the DC/AC power converter 10*b*.

First Embodiment

Figure 2:
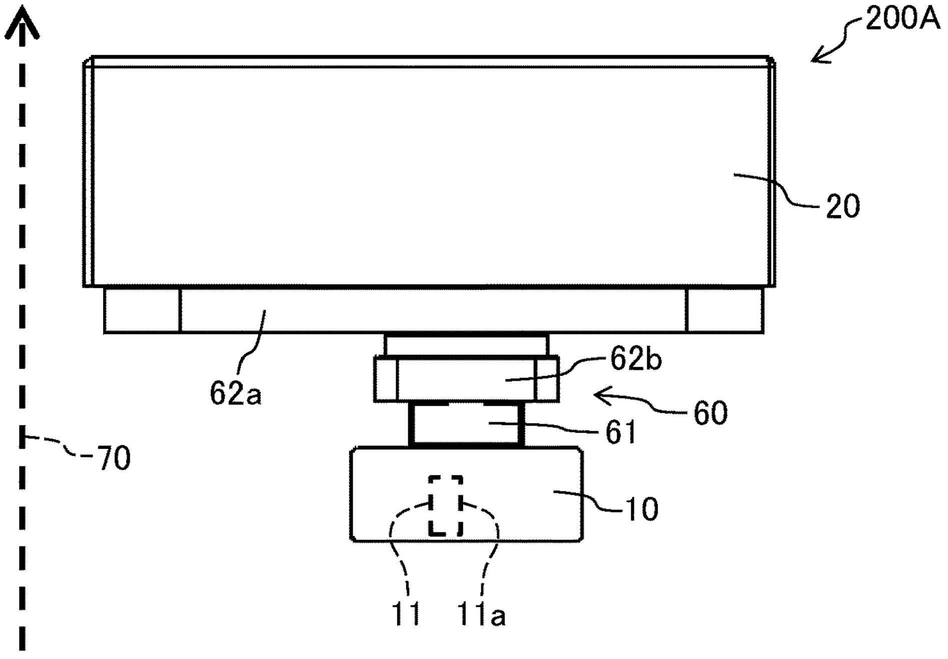
FIG. 2 is a front view of a power conversion system according to a first embodiment.
Figure 3:
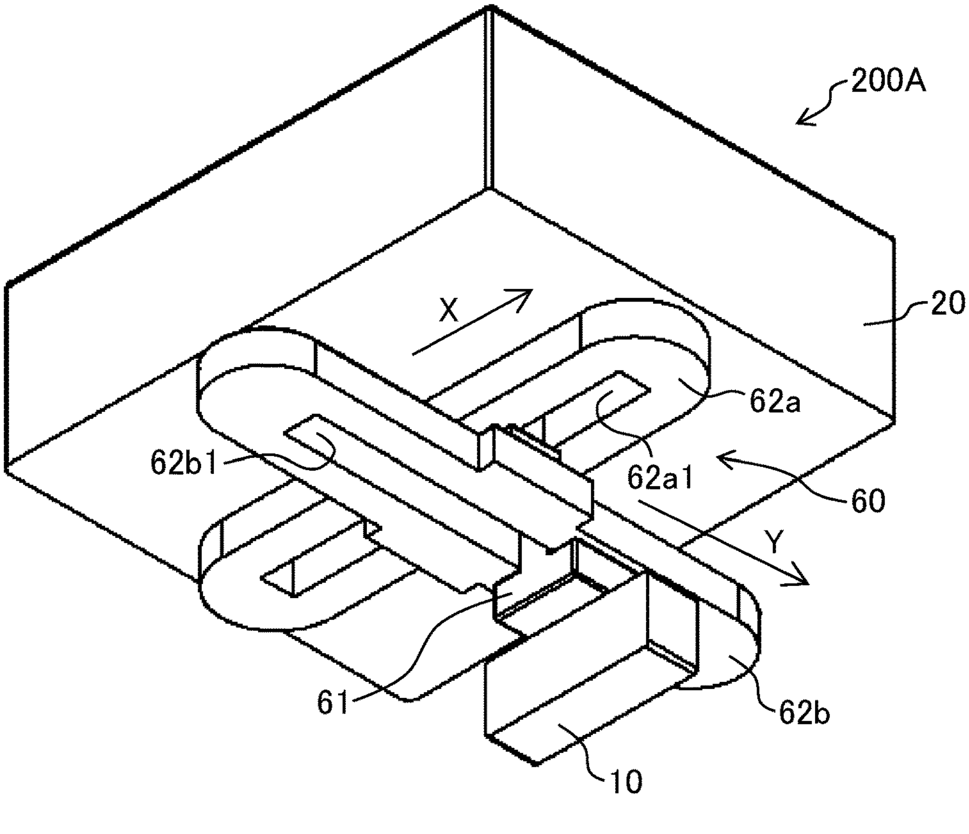
FIG. 3 is a perspective view of the power conversion system of the first embodiment in a case where the power conversion system is not tilted.
Figure 4:
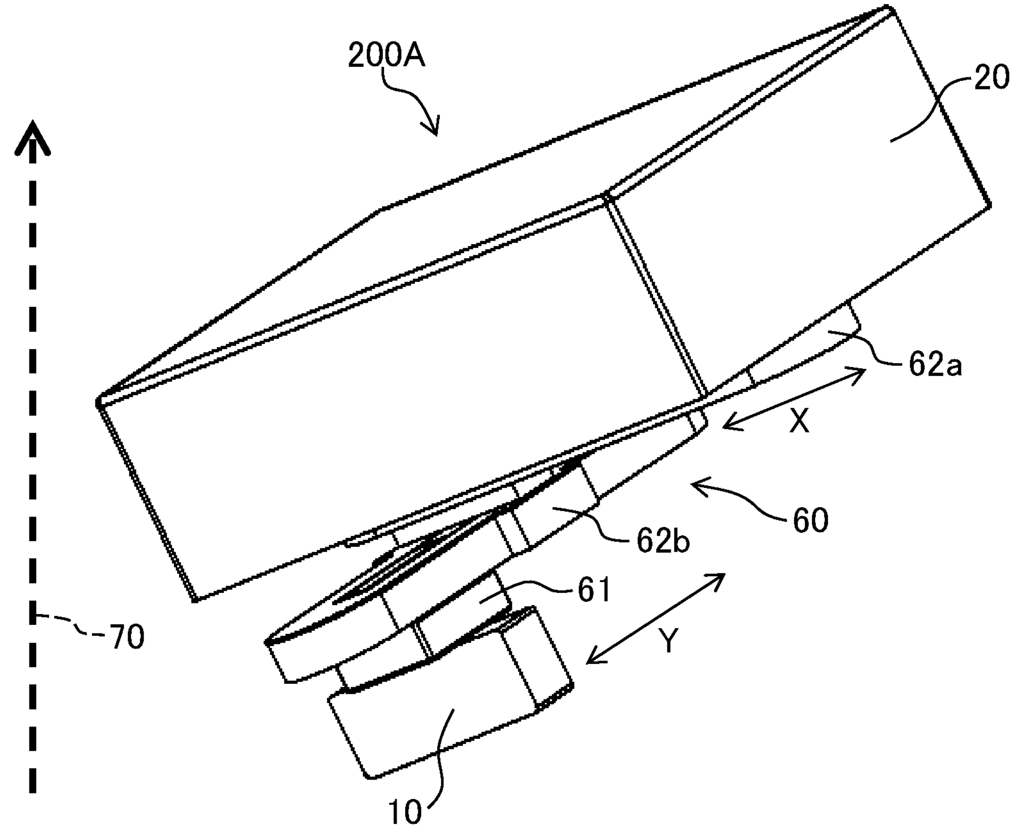
FIG. 4 is a perspective view of the power conversion system of the first embodiment in a case where the power conversion system is tilted.

A power conversion system according to a first embodiment will hereinafter be described with reference to FIGS. 2 to 4. FIG. 2 is a front view of the power conversion system according to a first embodiment, FIG. 3 is a perspective view of the power conversion system of the first embodiment in a case where the power conversion system is not tilted, and FIG. 4 is a perspective view of the power conversion system of the first embodiment in a case where the power conversion system is tilted. In the following description, at least one of the energy storages 20*a* and 20*b* will be referred to as an energy storage 20. Likewise, at least one of the AC/DC power converter 10*a*, the DC/AC power converter 10*b*, and the DC/DC power converter 10*c* will be referred to as a power converter 10. The power converter 10 has a semiconductor element.

As shown in FIG. 2, a power conversion system 200A includes the energy storage 20, a movable mechanism 60, and the power converter (module) 10. In FIGS. 2 and 4, the upper side of the paper surface is defined as the upper side in the vertical direction. The power conversion system 200A is incorporated in the flight vehicle 100 (see FIG. 1). The power conversion system 200A includes the energy storage 20*a* and the AC/DC power converter 10*a* that are shown in FIG. 1, and the movable mechanism 60. The power conversion system 200A includes the energy storage 20*b* and the AC/DC power converter 10*b* that are shown in FIG. 1, and the movable mechanism 60. The power conversion system 200A includes the energy storage 20*b* and the DC/DC power converter 10*c* that are shown in FIG. 1, and the movable mechanism 60.

The movable mechanism 60 includes slider rails 62*a* and 62*b*, and a slider movable unit 61. The slider rail 62*a* is attached to a lower part of the energy storage 20 in a vertical direction 70. The slider rail 62*a* is fixed in position. The slider rail 62*b* is attached to a lower part of the slider rail 62*a* in the vertical direction 70. The slider movable unit 61 is attached to a lower part of the slider rail 62*b* in the vertical direction 70. The power converter 10 is attached to a lower part of the slider movable unit 61 in the vertical direction 70. The power converter 10 has a semiconductor element 11. In this manner, when the power conversion system 200A is set in a horizontal state, the power converter 10 is located at the lowest portion in the vertical direction 70 with respect to the energy storage 20, the slider rails 62*a* and 62*b*, and the slider movable unit 61. In this manner, the power conversion system 200A has an arrangement structure in which the energy storage 20 shields the power converter 10 from neutrons originating from cosmic rays.

The semiconductor element 11 is a rectangular chip fabricated by packaging integrated electronic circuits including transistors on the surface of a wafer. In this embodiment, to reduces a neutron exposure area, when the power conversion system 200A is set horizontally, the semiconductor element 11 is disposed such that its plane (rectangular plane) 11*a* with a largest area is parallel with the vertical direction 70.

As shown in FIG. 3, the slider rail 62*a* is of a slender shape extending along a lower surface of the energy storage 20, and has a guide groove 62*al* that slidably supports the slider rail 62*b*. The slider rail 62*b* is substantially identical in shape with the slider rail 62*a*, and is attached in such a way as to be perpendicular to the slider rail 62*a*. The slider rail 62*b* has a guide groove 62*b*1 that slidably supports the slider movable unit 61. The slider rail 62*b* is guided in such a way as to be able to slide on the slider rail 62*a* along an arrowed X direction.

The power converter 10 is fixed to the slider movable unit 61. The slider movable unit 61 is supported such that the slider movable unit 61, together with the power converter 10, can slide on the slider rail 62*b* along an arrowed Y direction. The slider movable unit 61 and the slider rails 62*a* and 62*b* are made of a lightweight material, such as an aluminum alloy, a titanium alloy, or a polymer composite material. In this manner, the power converter 10 can be adjusted in position relative to a plane parallel to the bottom of the energy storage 20. The slider rail 62*b* and the slider movable unit 61 are configured to move by the own weight of the power converter 10. The slider rail 62*b* and the slider movable unit 61 may be configured such that they are provided with a power source, such as a motor, and move under control by a position controller.

As shown in FIG. 4, when the power conversion system 200A tilts in the Y direction, the power converter 10, together with the slider movable unit 61, moves along the Y direction toward the lower side of the vertical direction 70. The position of the power converter 10 is thus adjusted. Similarly, when the power conversion system 200A tilts in the X direction, the power converter 10, together with the slider movable unit 61 and the slider rail 62*b*, moves along the X direction toward the lower side of the vertical direction 70. The position of the power converter 10 is thus adjusted.

In this manner, as shown in FIG. 4, when the flight vehicle 100 (see FIG. 1) tilts during flight, the power converter 10 moves toward the lower side of the vertical direction 70 by its own weight or power of the motor, and consequently the position of the power converter 10 is adjusted to locate the power converter 10 below the energy storage 20 in the vertical direction 70. In other words, even when the flight vehicle 100 (see FIG. 1) tilts, the energy storage 20 can be kept above the power converter 10 in the vertical direction 70. Specifically, in such a state, the neutron attenuation performance of the neutron attenuating material (hydrogen or the like) stored in the energy storage 20 can be exerted in the vertical direction in which the intensity of neutrons is always at maximum, which means that energy of neutrons originating from cosmic rays can be attenuated. The neutron attenuating material stored in the energy storage 20 can reduce the intensity of neutrons carrying energy (1 MeV<E<20 MeV). By attenuating neutrons with such intensity, the influence of neutrons on the semiconductor element 11 can be suppressed effectively.

Figure 5A:
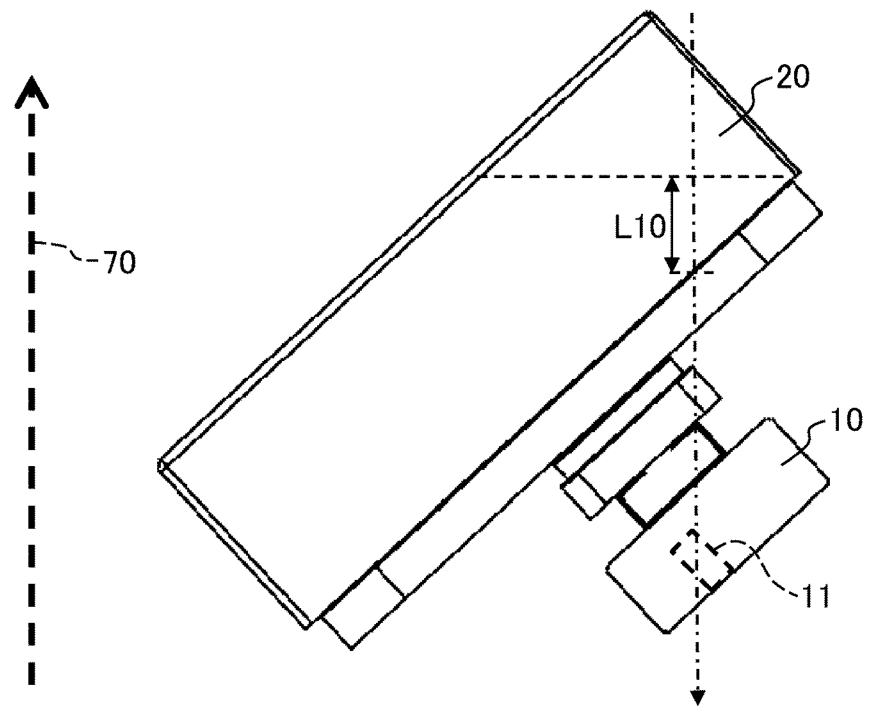
FIG. 5A is a diagram of a configuration in which a power converter of the first embodiment is not movable.
Figure 5B:
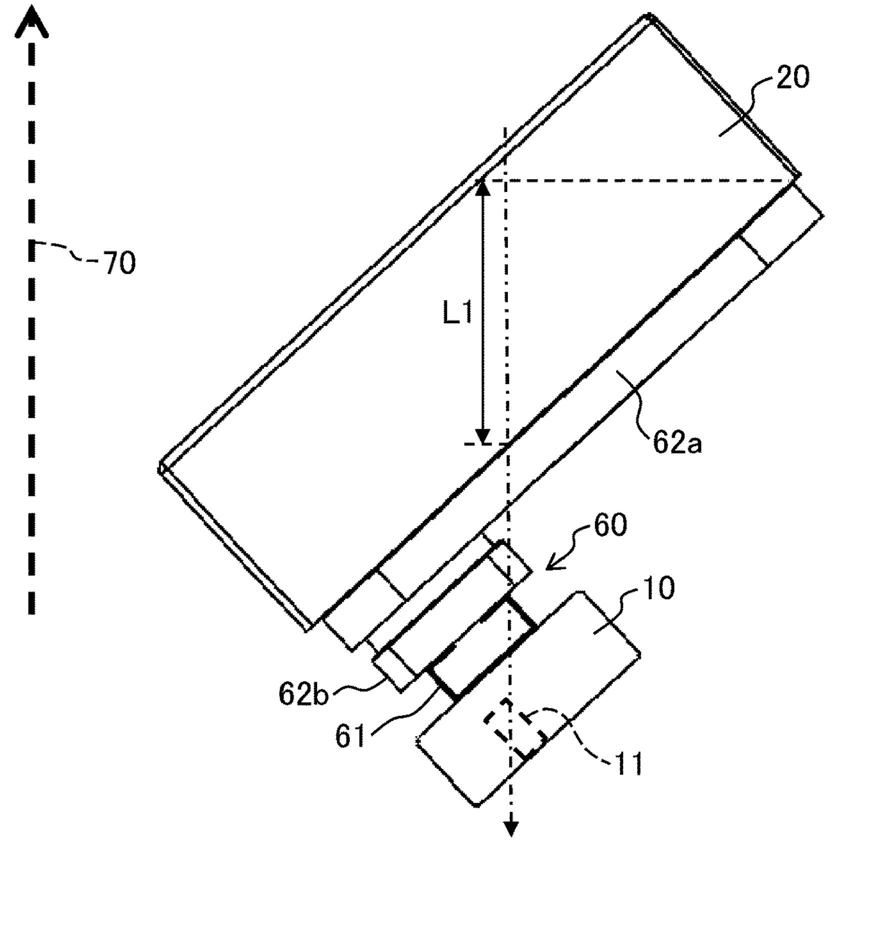
FIG. 5B is a diagram of a configuration in which the power converter of the first embodiment is movable.

FIG. 5A is a diagram of a configuration in which the power converter of the first embodiment is not movable, and FIG. 5B is a diagram of a configuration in which the power converter of the first embodiment is movable. The cases of FIGS. 5A and 5B will be described as cases where a liquid fuel (liquid hydrogen) is used as an energy source in the energy storage 20. In each of FIGS. 5A and 5B, the liquid level of the liquid fuel in the fuel tank, i.e., the energy storage 20 is indicated by a horizontal broken line and the power conversion system 200A tilted at the same angle is shown.

As shown in FIG. 5A, in the configuration in which the power converter 10 is not movable, the level (depth) of the liquid fuel is L10 with respect to a neutron beam (indicated by a single-dot chain line) coming in from above the semiconductor element 11 in the vertical direction 70. In contrast, in the configuration in which the movable mechanism 60 that allows the power converter 10 to move is provided, the level (depth) of the liquid fuel is L1 with respect to a neutron beam (indicated by a single-dot chain line) coming in from above the semiconductor element 11 in the vertical direction 70, as shown in FIG. 5B. As indicated by FIGS. 5A and 5B, the neutron attenuation performance gets higher as the level of the liquid fuel (fuel layer thickness) gets higher. Therefore, by adopting the configuration in which the power converter 10 is movable to increase the liquid fuel level to the level (depth) L1 higher than the level (fuel layer thickness) L10, the neutron attenuation performance can be improved.

The first embodiment configured in the above manner provides the power conversion system incorporated in the flight vehicle 100. The power conversion system includes the power converter 10 (module) having the semiconductor element 11 stored therein, and in the power conversion system, the energy storage 20 is disposed above the power converter 10 in the vertical direction 70, the energy storage 20 storing the solid or liquid energy source containing the neutron attenuating material. According to this system, the semiconductor element 11 of the power converter 10 can be protected from neutron beams in a simple configuration without using a special structure. In addition, in the flight vehicle 100 (see FIG. 1) equipped with the power conversion system 200A of the first embodiment, the risk of neutron beams' causing the semiconductor element 11 accidental failure can be suppressed.

In the first embodiment, the configuration including the movable mechanism 60 that allows the power converter 10 to shift its position has been described exemplarily. A different configuration, however, may also be adopted, in which the power converter 10 is fixed to a floor as the energy storage 20 is set movable, and the power converter 10 is located below the energy storage 20 in the vertical direction 70 in response to a tilt of the flight vehicle 100.

Second Embodiment

Figure 6:
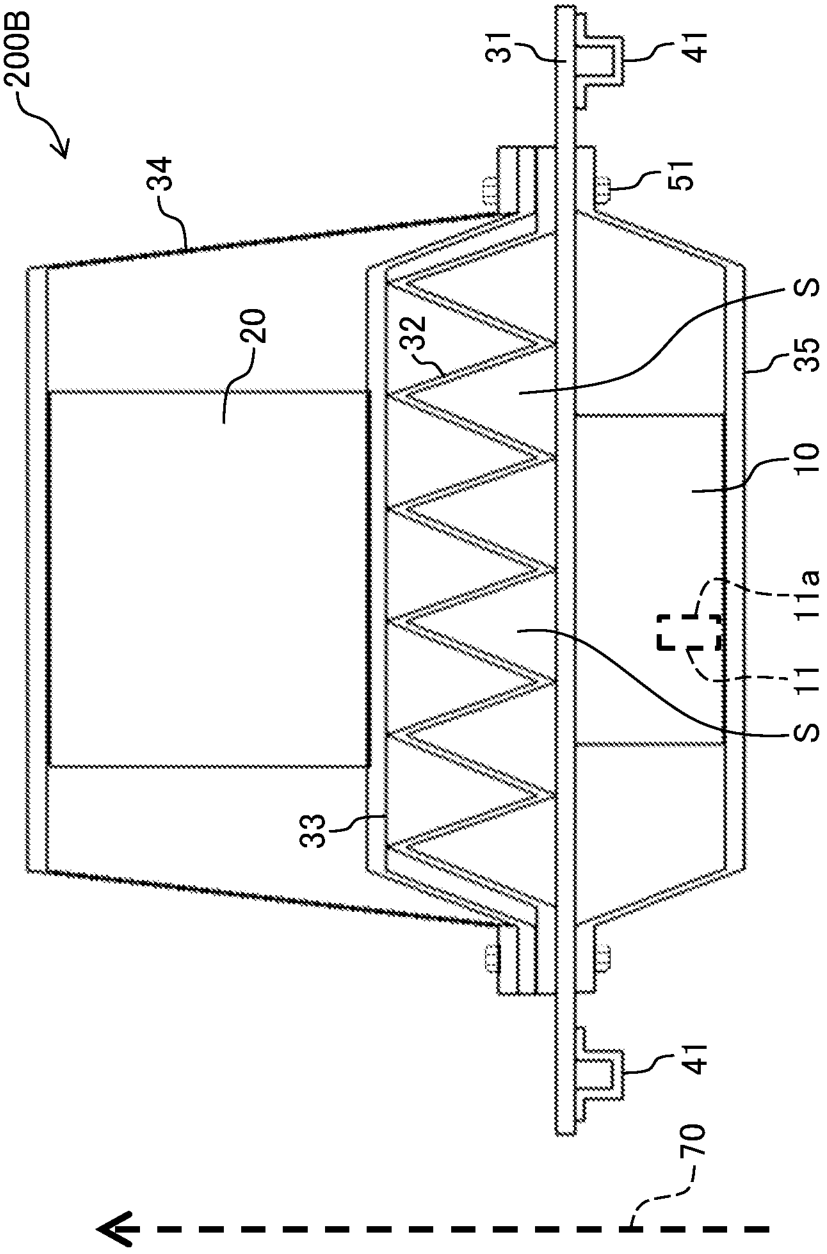
FIG. 6 is a front view of a power conversion system according to a second embodiment.

FIG. 6 is a front view of a power conversion system according to a second embodiment.

As shown in FIG. 6, a power conversion system 200B includes a top case 34, the energy storage 20, a middle case 33, a shock-absorber (shock-absorbing material) 32, a floor 31, the power converter 10, fasteners 51, and a bottom case 35. The floor 31 is not limited to a member making up the floor surface of the flight vehicle 100.

The floor 31 is attached to the top of body frames 41. The middle case 33 is disposed above the floor 31. The shock-absorber 32 is disposed between the floor 31 and the middle case 33. The energy storage 20 is disposed on the middle case 33 in the vertical direction 70. The top case 34 is attached in such a way as to encircle the energy storage 20 from above the energy storage 20. The bottom case 35 is disposed under the floor 31 in the vertical direction 70. The power converter 10 is disposed between the bottom case 35 and the floor 31. The power converter 10 has the semiconductor element 11.

The shock-absorber 32 has a corrugated structure capable of absorbing impact from outside. The shock-absorber 32 has gaps S formed in a direction perpendicular to the vertical direction 70. The gaps S allow air to flow therethrough. As a result, the power conversion system 200B has its weight reduced and is given a structure (ventilation function) that ventilates in a direction perpendicular to the sheet surface. The shape of the shock-absorber 32 is not limited to the corrugated shape. Any given shape allowing ventilation, such as a lattice shape or honeycomb shape other than the corrugated shape, may also be adopted.

The top case 34, the middle case 33, the shock-absorber 32, and the bottom case 35 are all fastened to the floor 31 by the fasteners 51. The shock-absorber 32, the middle case 33, the top case 34, and the bottom case 35 are made of a lightweight material, such as an aluminum alloy, a titanium alloy, or a polymer composite material. To reduce a neutron exposure area, when the power conversion system 200B is set horizontally, the semiconductor element 11 is disposed such that its plane (a rectangular plane of the chip) 11*a* with the largest area is parallel with the vertical direction 70.

The energy storage 20 is disposed above the power converter 10 in the vertical direction 70. In such an arrangement, the attenuation effect of the neutron attenuating material (hydrogen or the like) stored in the energy storage 20 can be exerted in the vertical direction 70 in which the intensity of neutrons is at maximum.

In the power conversion system 200B of the second embodiment, the shock-absorber 32 is provided between the power converter 10 and the energy storage 20. Because of the presence of the shock-absorber 32, even when the flight vehicle 100 (aircraft) shakes suddenly due to air turbulence or the like, direct collision between the energy storage 20 and the power converter 10 can be prevented.

In the second embodiment, the shock-absorber 32 has the gaps S to offer the ventilation function. This allows avoiding thermal interference between the energy storage 20 and the power converter 10, thus reducing a failure rate of failures caused by heat imbalance.

Third Embodiment

Figure 7:
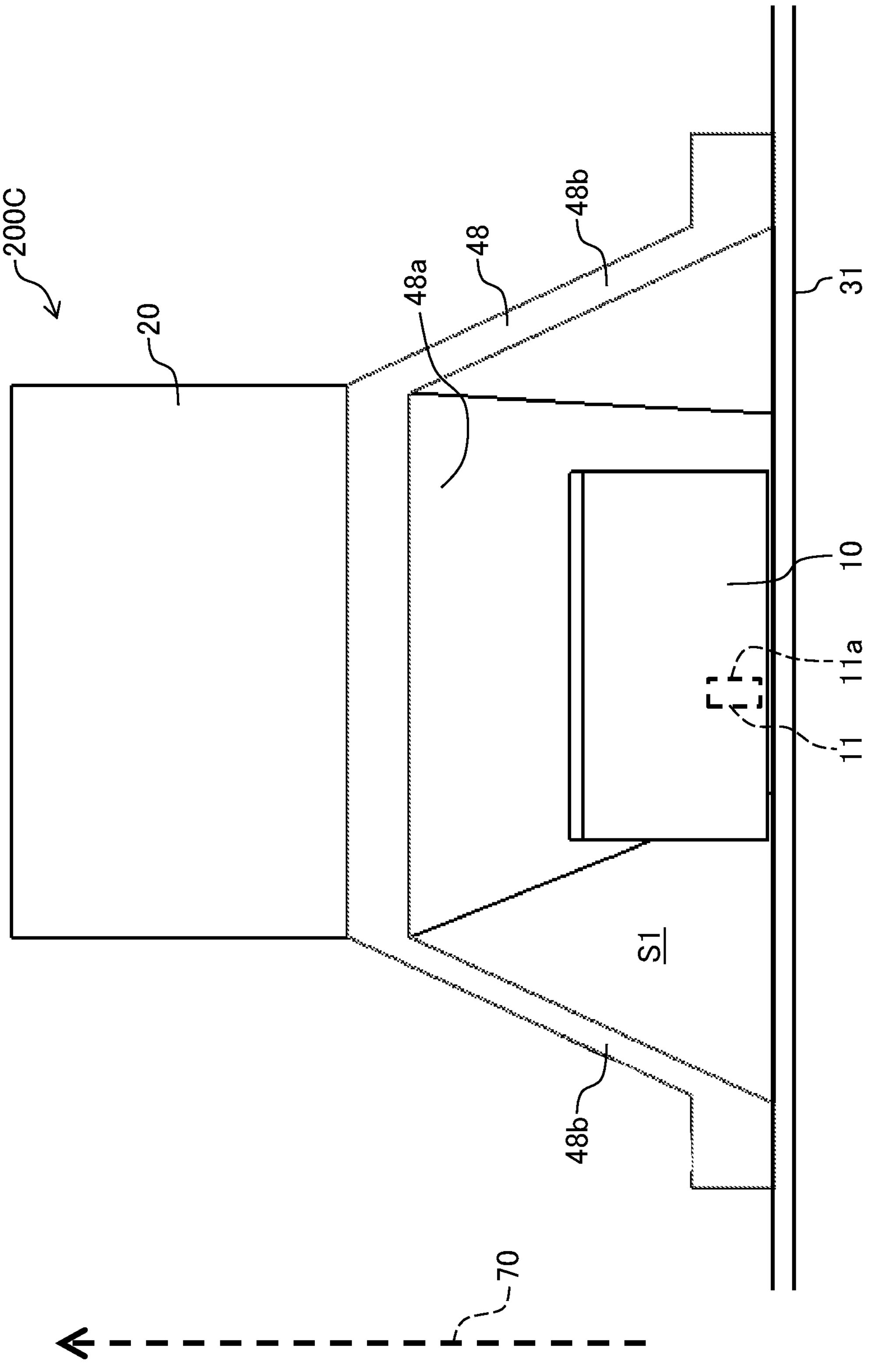
FIG. 7 is a front view of a power conversion system according to a third embodiment.
Figure 8:
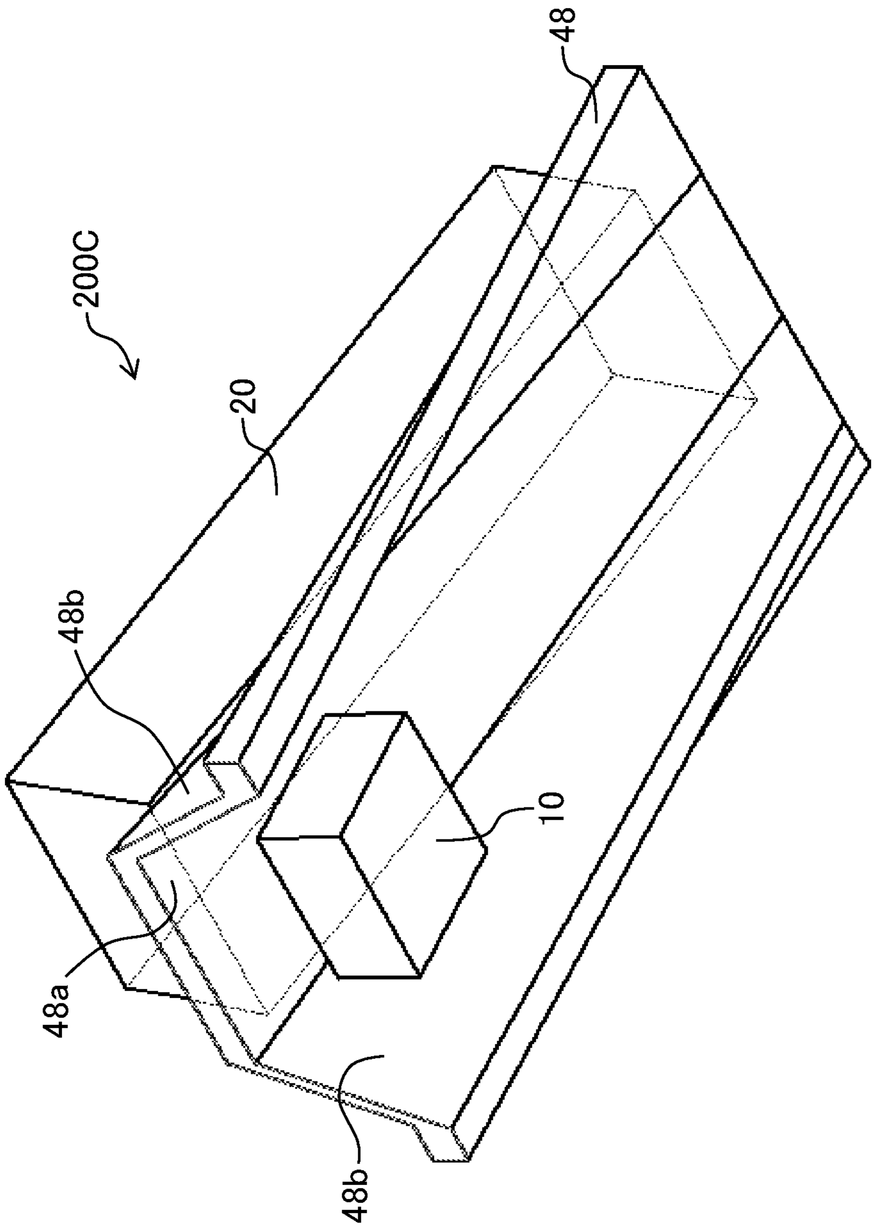
FIG. 8 is a perspective view of the power conversion system of the third embodiment.
Figure 9:
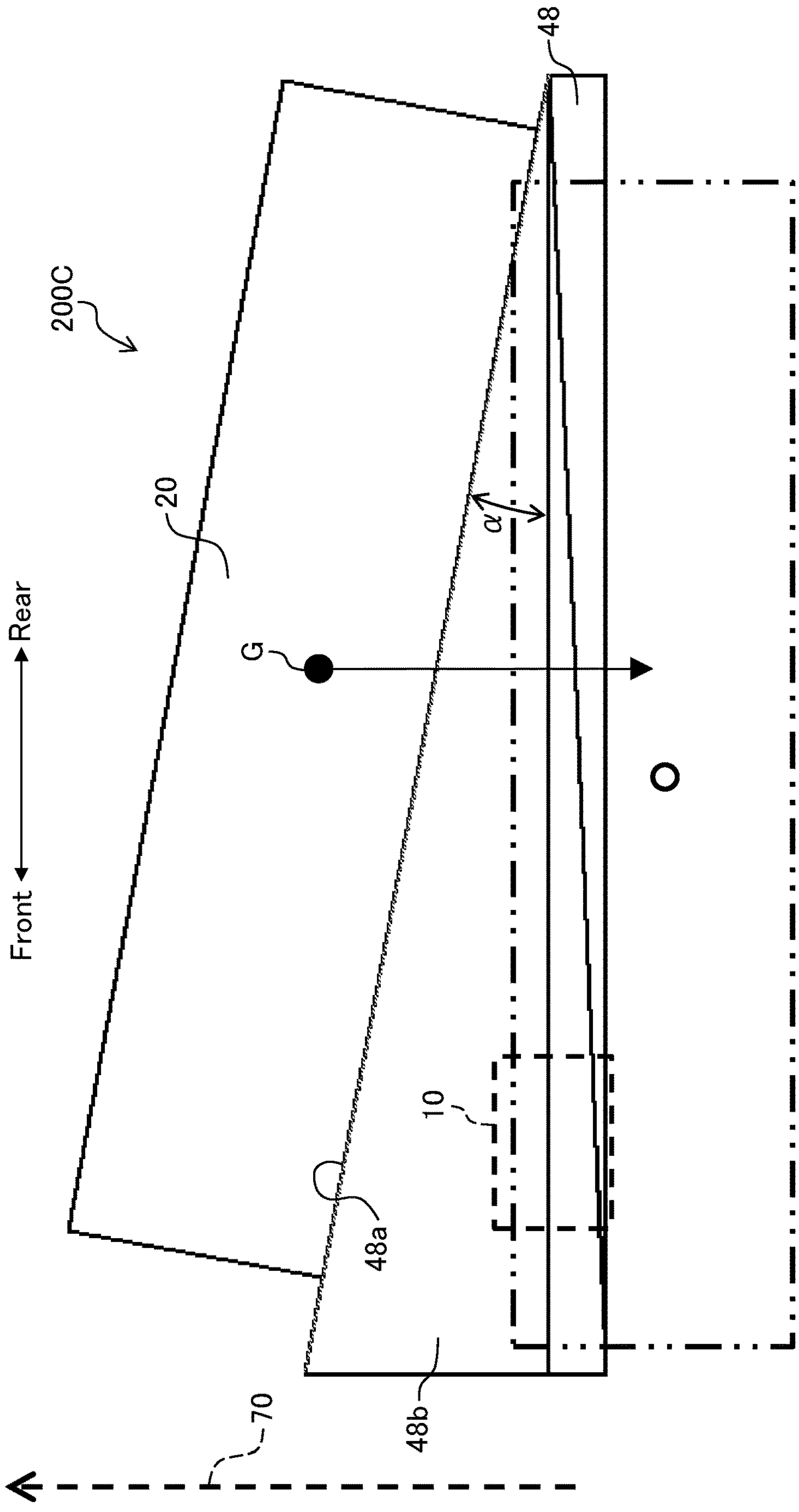
FIG. 9 is a side view of the power conversion system of the third embodiment.

FIG. 7 is a front view of a power conversion system according to a third embodiment, FIG. 8 is a perspective view of the power conversion system of the third embodiment, and FIG. 9 is a side view of the power conversion system of the third embodiment. FIG. 8 shows a state in which the power converter 10 is viewed from below.

In FIGS. 8 and 9, the floor 31 is not illustrated.

As shown in FIGS. 7 and 8, a power conversion system 200C includes the energy storage 20, an angled pedestal 48 (adjustment mechanism), and the power converter 10. The power converter 10 has the semiconductor element 11 (see FIG. 7). The angled pedestal 48 bears the energy storage 20 placed thereon in an angled position, and is fastened to the floor 31 (see FIG. 6) of the flight vehicle 100 (see FIG. 1) with fasteners (not illustrated).

The angled pedestal 48 includes a sloped part 48*a* bearing the energy storage 20, and support parts 48*b* extending from the sloped part 48*a* toward the floor 31. As a result, a space S1 (see FIG. 7) of a substantially triangular shape in a side view is formed between the angled pedestal 48 and the floor 31. The angled pedestal 48 is made of a lightweight material, such as aluminum, a titanium alloy, or a polymer composite material. The energy storage 20 is disposed on the top of the angled pedestal 48.

The power converter 10 is placed in the space S1 between the angled pedestal 48 and the floor 31. As a result, the energy storage 20 is disposed above the power converter 10 in the vertical direction. Hence the attenuation performance of the attenuating material (hydrogen or the like) stored in the energy storage 20 can be well exerted in the vertical direction in which the intensity of neutrons is at maximum. To reduce a neutron exposure area, the semiconductor element 11 is disposed such that its plane 11*a* (see FIG. 7) with the largest area is parallel with the vertical direction 70.

As shown in FIG. 9, disposing the energy storage 20 on the top of the angled pedestal 48 puts the energy storage 20 in a tilted state. A black circle (•) in FIG. 9 indicates the position of the barycenter G of the energy storage 20. At this barycenter G, a downward force acts in the vertical direction 70. As opposed to the black circle (•), a white circle (○) is shown in an area framed by a two-dot chain line in FIG. 9. This white circle (○) represents the barycenter G of the energy storage 20 in a case where the angled pedestal 48 is not provided and therefore the energy storage 20 is not tilted. As indicated in FIG. 9, by disposing the energy storage 20 in a tilted position in which its front side is elevated as its rear side is lowered, the barycenter G can be shifted rearward relative to the barycenter G in the case of the energy storage 20 being not tilted.

The energy storage 20 is a component whose weight accounts for a large proportion of the total weight of the flight vehicle 100 (see FIG. 1), and for this reason, the shift of the barycenter G can be used as a means for adjusting the barycenter of the flight vehicle 100 (aircraft). Besides, in the case of the flight vehicle 100, occupants occupy its front side and therefore their weights concentrate on the front side of the flight vehicle 100. This makes it important to improve the barycenter balance of the flight vehicle 100 (see FIG. 1).

To meet this requirement, according to the third embodiment, the angled pedestal 48 (adjustment mechanism) for adjusting the barycenter G of the energy storage 20 is provided. Thus, by moving the barycenter of the energy storage 20 rearward, the barycenter balance of the flight vehicle 100 can be improved. It should be noted that a tilt angle α (see FIG. 9) of the energy storage 20 can be set properly according to the barycenter balance of the flight vehicle 100 (see FIG. 1).

Fourth Embodiment

Figure 10:
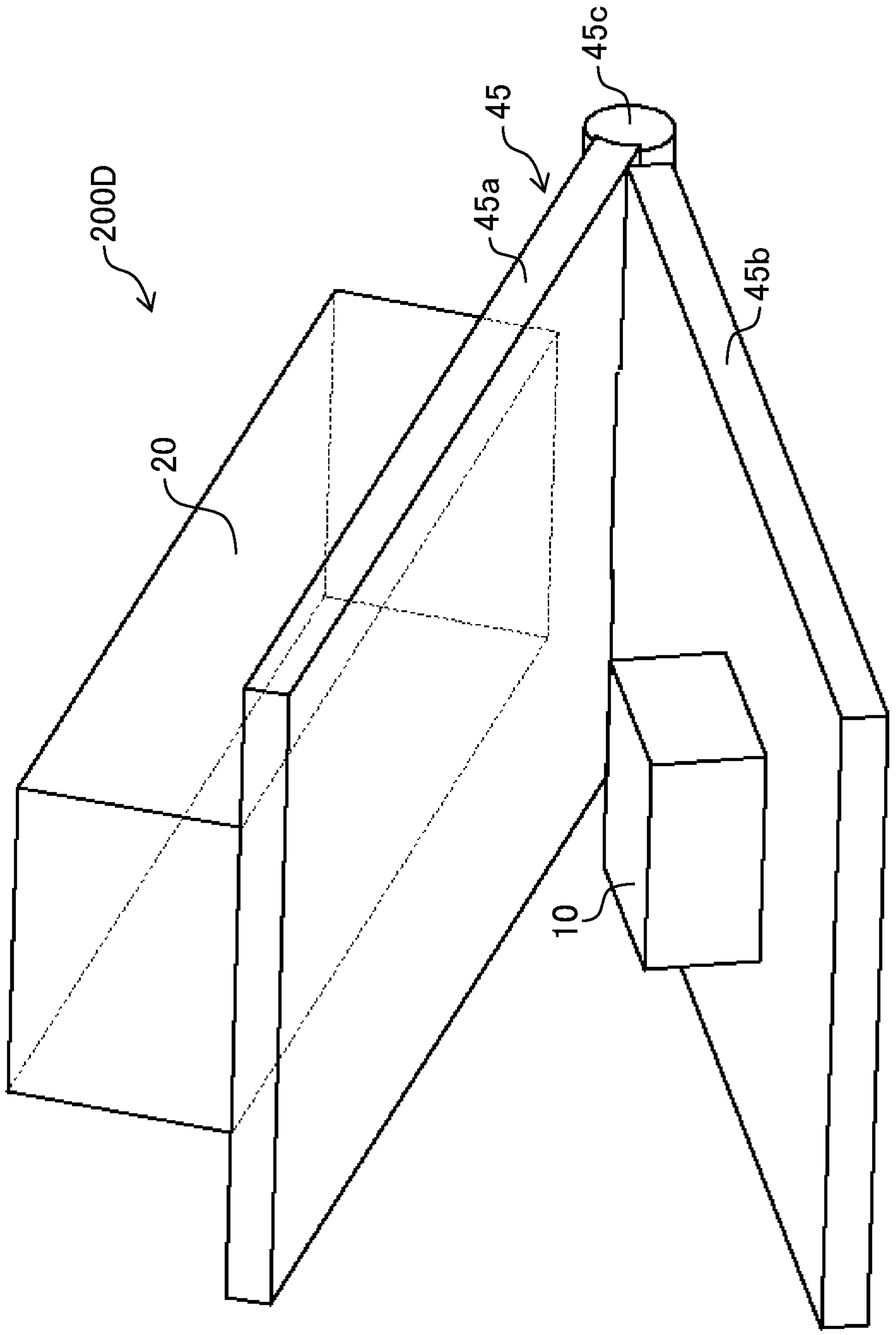
FIG. 10 is a perspective view of a power conversion system according to a fourth embodiment.
Figure 11A:
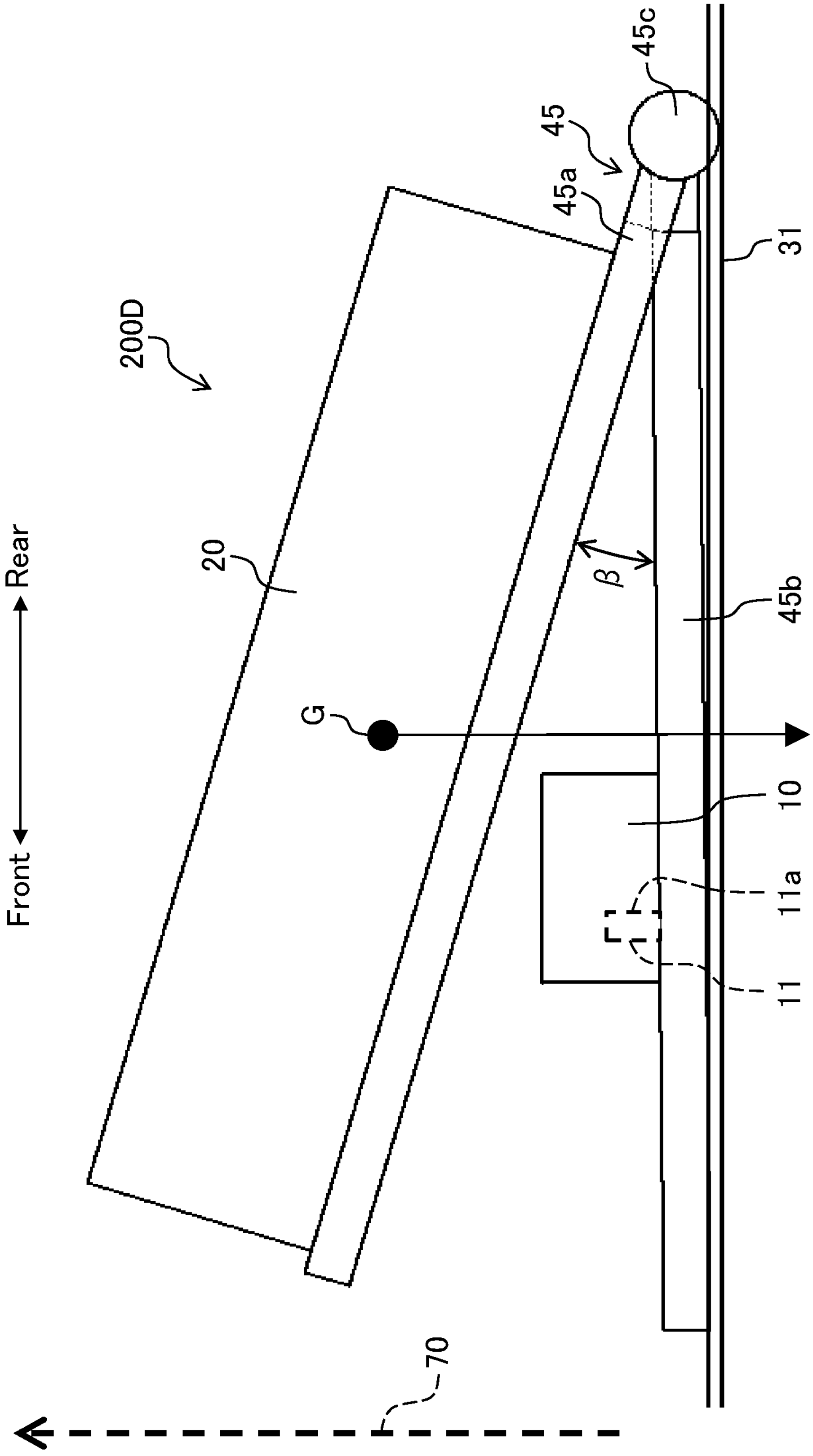
FIG. 11A is a side view showing a case where a tilt angle of the electric conversion system of the fourth embodiment is small.
Figure 11B:
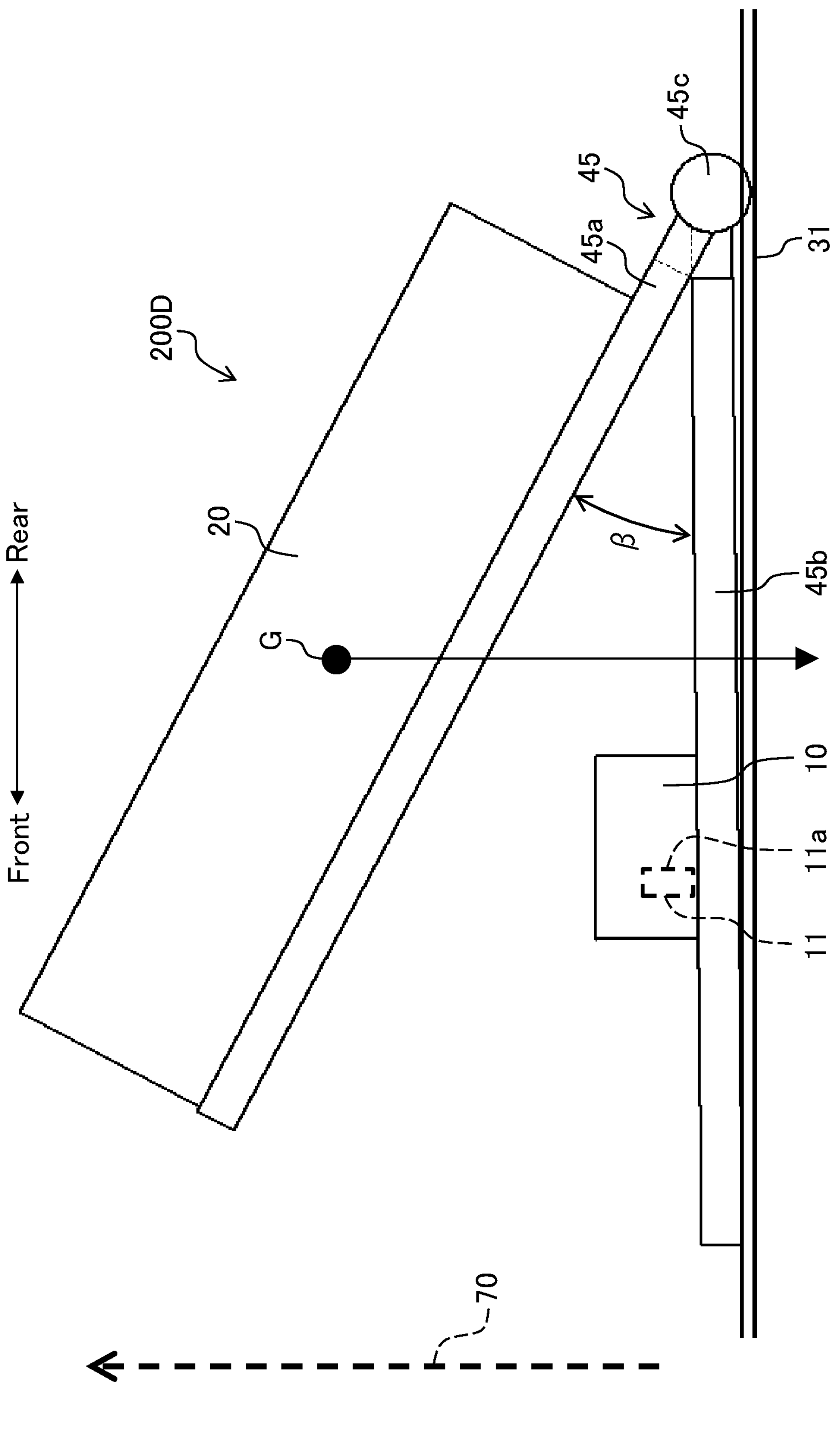
FIG. 11B is a side view showing a case where a tilt angle of the electric conversion system of the fourth embodiment is large.

FIG. 10 is a perspective view of a power conversion system according to a fourth embodiment, FIG. 11A is a side view showing a case where a tilt angle of the electric conversion system of the fourth embodiment is small, and FIG. 11B is a side view showing a case where a tilt angle of the electric conversion system of the fourth embodiment is large. In FIG. 10, the semiconductor element 11 is not illustrated.

As shown in FIG. 10, a power conversion system 200D includes the energy storage 20, an adjustment mechanism 45, and the power converter 10. The power converter 10 has the semiconductor element 11.

The adjustment mechanism 45 causes the energy storage 20 to tilt at various angles, and includes a top plate 45*a*, a bottom plate 45*b*, and a rotating shaft 45*c*. The top plate 45*a* and the bottom plate 45*b* are flat plates, and have their respective one sides attached to the rotating shaft 45*c* provided with a motor.

The energy storage 20 is disposed on the top of the top plate 45*a*. The power converter 10 is disposed on the top of the bottom plate 45*b*. As a result, the energy storage 20 is disposed above the power converter 10 (semiconductor element 11) in the vertical direction. In such an arrangement, the shielding effect of the shielding material (hydrogen or the like) stored in the energy storage 20 can be exerted in the vertical direction in which the intensity of neutrons is at maximum.

As shown in FIGS. 11A and 11B, in the power conversion system 200D, to reduce a neutron exposure area, the semiconductor element 11 is disposed such that its surface 11*a* with the largest area is parallel to the vertical direction 70.

The bottom plate 45*b* is placed on the floor 31 of the flight vehicle 100 (see FIG. 1). As shown in FIG. 11A, an angle β between top plate 45*a* and bottom plate 45*b* can be adjusted by rotating the rotating shaft 45*c*. The top plate 45*a* and the bottom plate 45*b* are made of a lightweight material, such as aluminum, a titanium alloy, or a polymer composite material.

The energy storage 20 limits the maximum adjustment width of the angle β so that the energy storage 20 is disposed above the power converter 10 in the vertical direction 70. FIG. 11A depicts a configuration in which a tilt angle of the top plate 45*a* is adjusted to be small. FIG. 11B depicts a configuration in which a tilt angle of the top plate 45*a* is adjusted to be large. The position of the barycenter G of the energy storage 20 gets closer to the rotating shaft 45*c* as the tilt angle gets larger. The energy storage 20 is the component whose weight accounts for a large proportion of the total weight of the flight vehicle 100 (see FIG. 1), and for this reason, the shift of the barycenter G can be used as a means for adjusting the barycenter of the flight vehicle 100.

In this manner, in the fourth embodiment, the adjustment mechanism 45 causes the energy storage 20 to tilt at various angles. This allows the barycenter G of the energy storage 20 to shift, thus allowing the barycenter balance of the flight vehicle 100 to be improved in accordance with the type of the flight vehicle 100.

Fifth Embodiment

Figure 12:
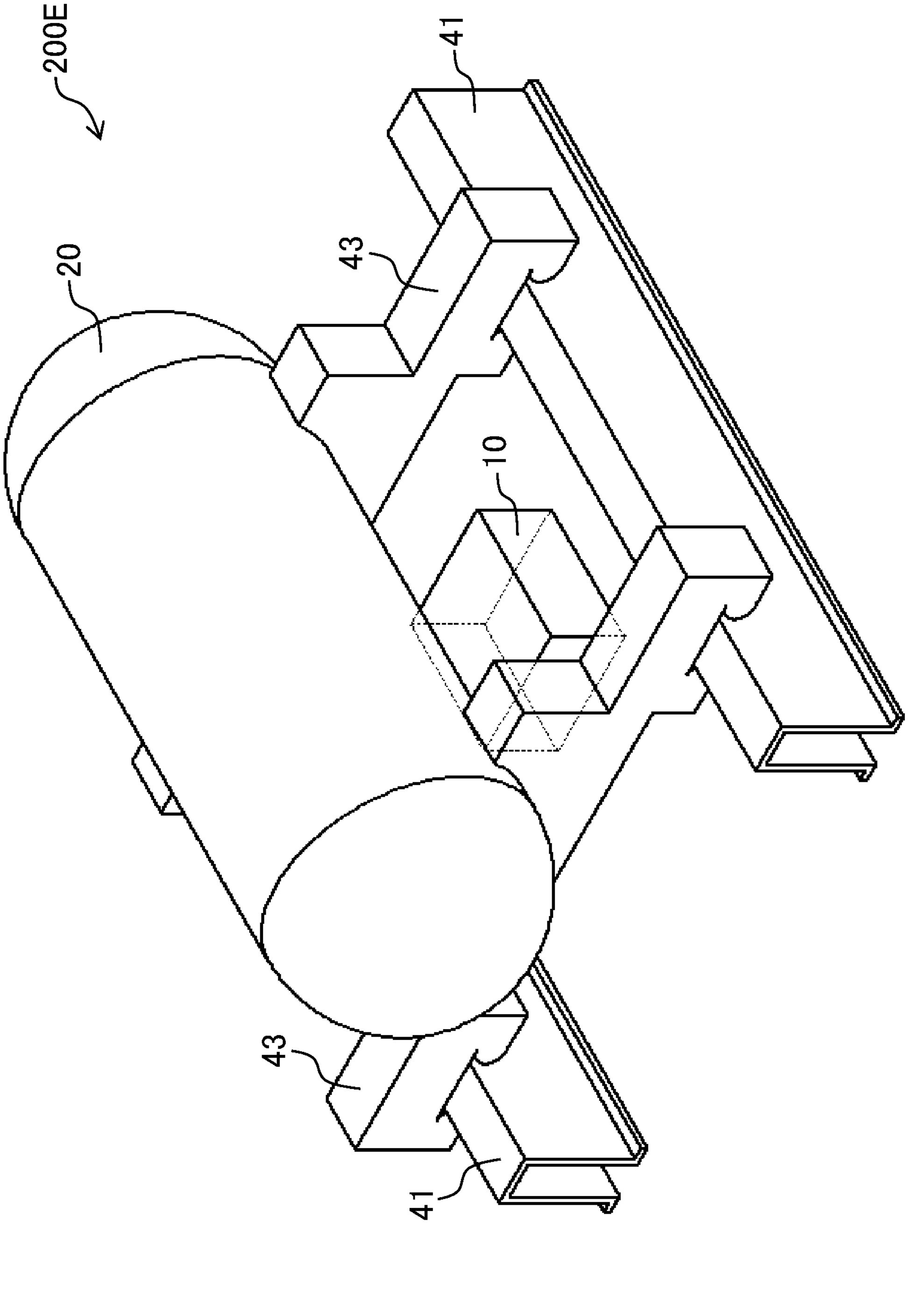
FIG. 12 is a perspective view of a power conversion system according to a fifth embodiment.
Figure 13:
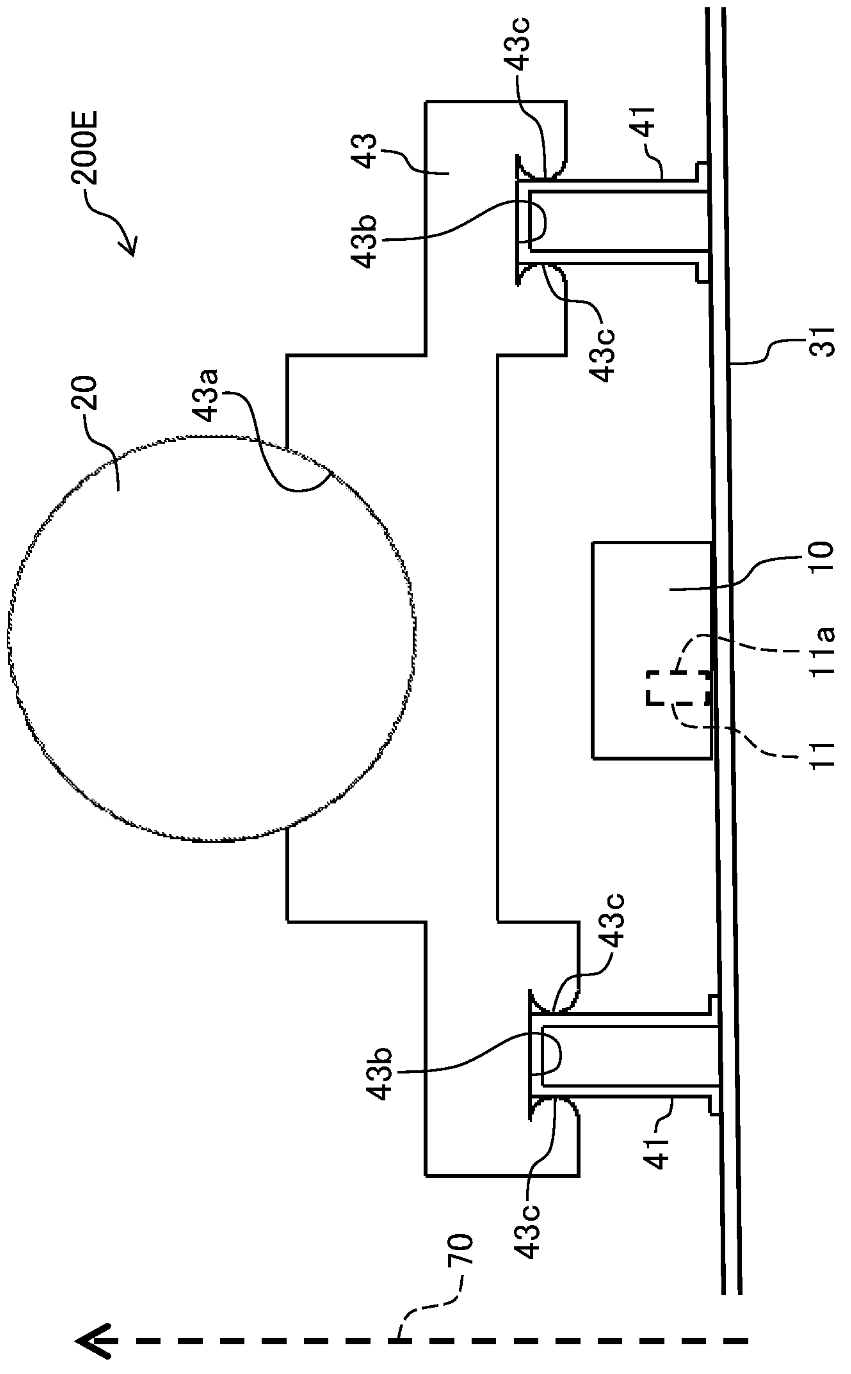
FIG. 13 is a front view of the power conversion system of the fifth embodiment.
Figure 14A:
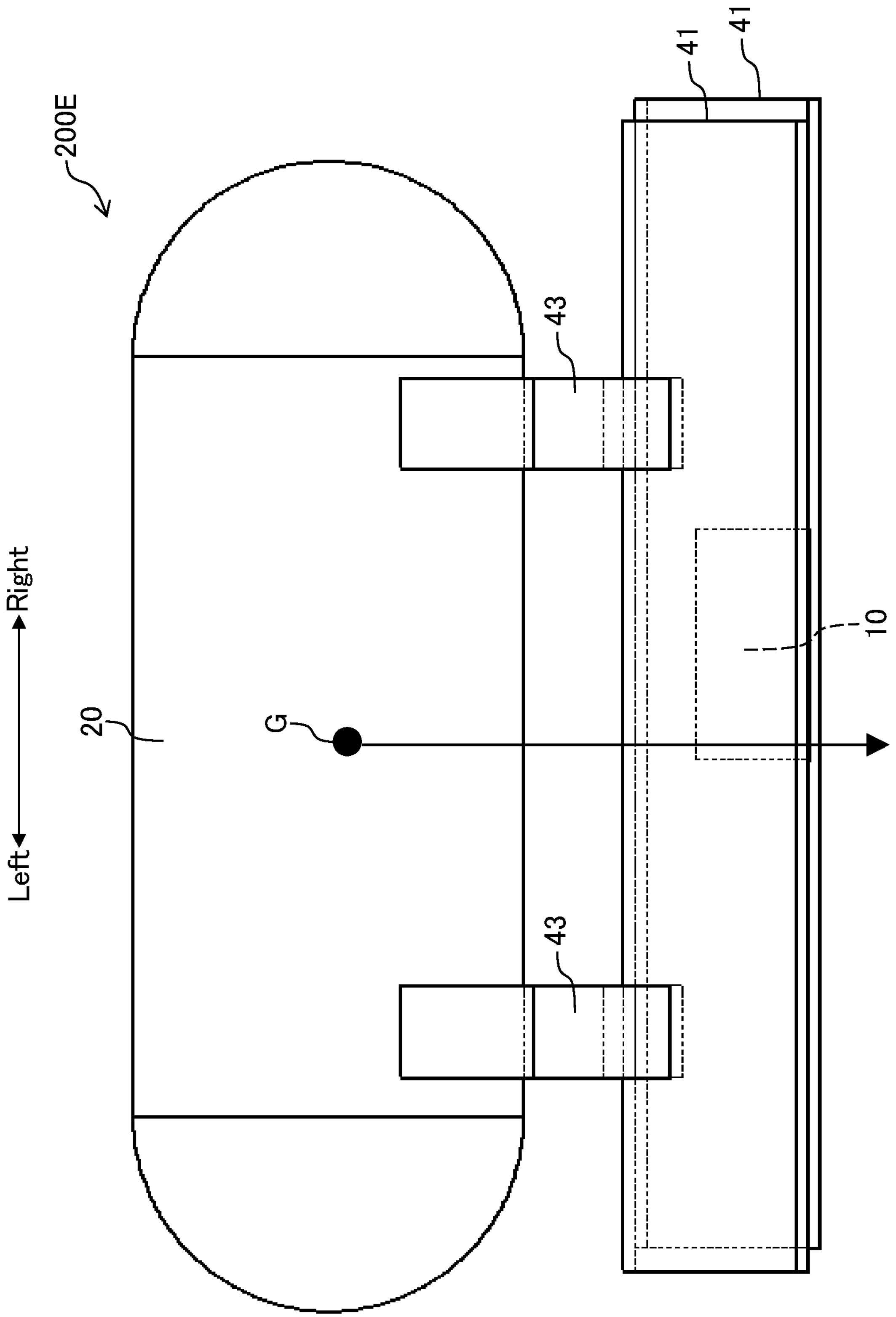
FIG. 14A is a side view showing a case where the position of the barycenter of the power conversion system of the fifth embodiment is adjusted leftward.
Figure 14B:
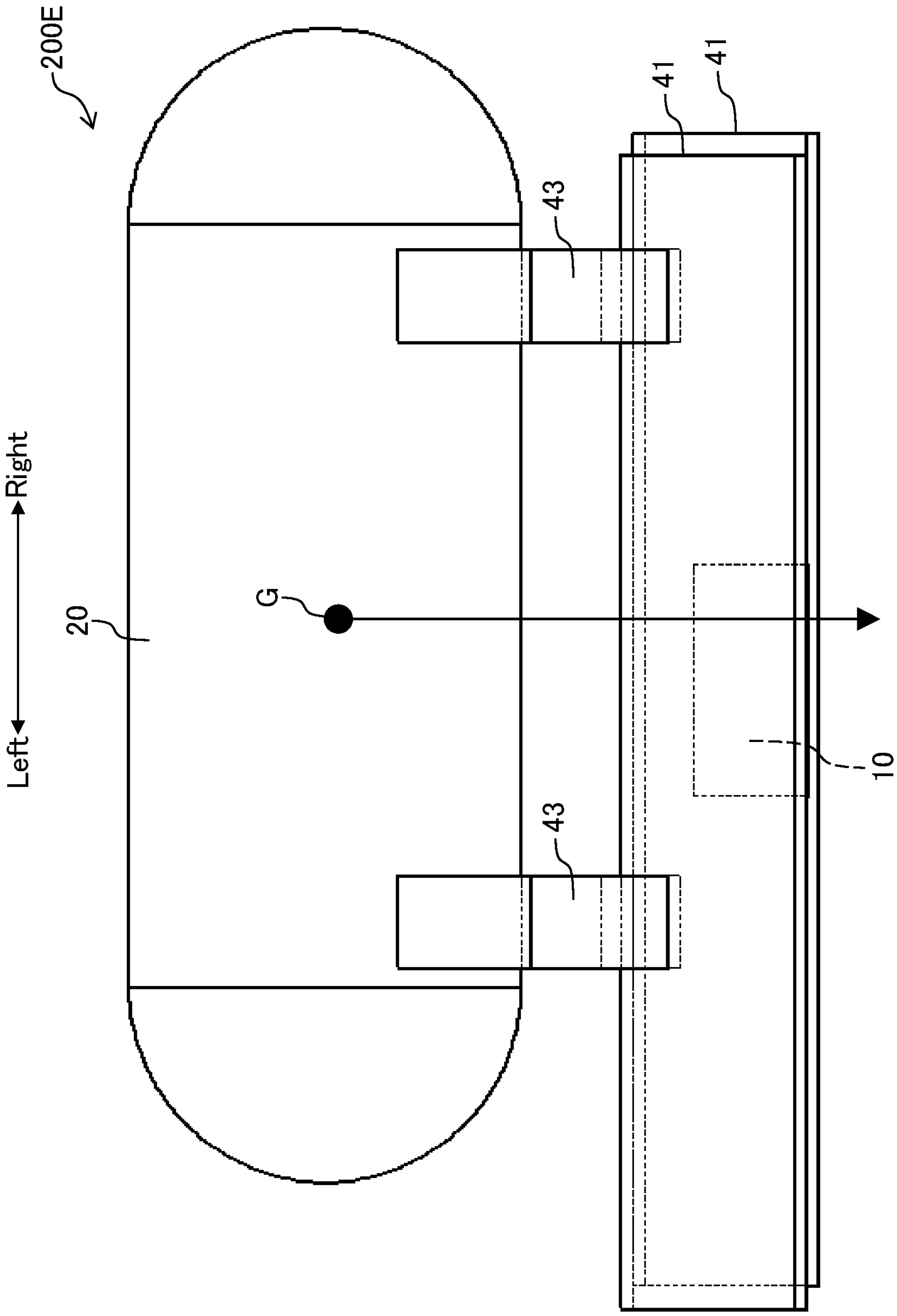
FIG. 14B is a side view showing a case where the position of the barycenter of the power conversion system of the fifth embodiment is adjusted rightward.

FIG. 12 is a perspective view of a power conversion system according to a fifth embodiment, and FIG. 13 is a front view of the power conversion system of the fifth embodiment. FIG. 14 is a side view showing a case where the position of the barycenter of the power conversion system of the fifth embodiment is adjusted leftward, and FIG. 15 is a side view showing a case where the position of the barycenter of the power conversion system of the fifth embodiment is adjusted rightward. In FIGS. 12, 14A, and 14B, the floor 31 is not illustrated.

As shown in FIG. 12, a power conversion system 200E includes the energy storage 20, movable pedestals 43, body frames 41, and the power converter 10. In the fifth embodiment, the movable pedestals 43 and the body frames 41 make up an adjustment mechanism.

The movable pedestals 43 are provided on both sides of the energy storage 20 of a cylindrical shape, and are supported by the body frames 41 fixed to the floor 31 (see FIG. 13). The movable pedestals 43 are made of a lightweight material, such as aluminum, a titanium alloy, or a polymer composite material. A plurality of the body frames 41 are provided such that each body frame 41 is set along the axial direction of the energy storage 20. The body frame 41 is longer than the energy storage 20 in its axial direction.

As shown in FIG. 13, each movable pedestal 43 has a fixing part 43*a* to which the energy storage 20 is fixed, and a recessed part 43*b* in which the body frame 41 is inserted and supported. A sliding part (movable part) 43*c* that slides over the body frame 41 is formed in the recessed part 43*b*. The sliding part 43*c* can move relative to the body frame 41.

The energy storage 20 is placed on the top of the movable pedestals 43 and is fixed there. The power converter 10 is disposed on the floor 31 below the energy storage 20 in the vertical direction 70. The energy storage 20 is thus disposed above the power converter 10 in the vertical direction 70. The power converter 10 has the semiconductor element 11. To reduce a neutron exposure area, the semiconductor element 11 is disposed such that its plane 11*a* with the largest area is parallel with the vertical direction 70. In such an arrangement, the attenuation effect of the neutron attenuating material (hydrogen or the like) stored in the energy storage 20 can be exerted in the vertical direction 70 in which the intensity of neutrons is at maximum.

The movable pedestal 43 is attached to the body frame 41 via the sliding part 43*c*. This allows the energy storage 20 to move, together with the movable pedestals 43, slidably over the body frames 41. The maximum width of movement of the energy storage 20 is limited so that the energy storage 20 is kept disposed above the power converter 10 in the vertical direction.

In addition, in the power conversion system 200E in which the energy storage 20 has a circular cross section, the semiconductor element 11 is located near a point underneath the full-diameter part of the energy storage 20, as shown in FIG. 13. As a result, neutrons that affect the semiconductor element 11 can be effectively attenuated.

FIG. 14A depicts a configuration in which the movable pedestals 43 shift leftward along the body frames 41. FIG. 14B depicts a configuration in which the movable pedestals 43 shift rightward along the body frames 41. In FIG. 14A, the position of the barycenter G of the energy storage 20 shifts leftward relative to the body frames 41. In FIG. 14B, the position of the barycenter G of the energy storage 20 shifts rightward relative to the body frames 41. A direction in which the barycenter G is shifted is not limited to the left and right, and other directions, such as the front and rear, may be adopted when necessary.

In this manner, the position of the barycenter G of the energy storage 20 can be adjusted through movement of the movable pedestals 43. The energy storage 20 is the component whose weight accounts for a large proportion of the total weight of the flight vehicle 100 (see FIG. 1), and for this reason, the shift of the barycenter G can be used as a means for adjusting the barycenter balance of the flight vehicle 100. The fifth embodiment includes the adjustment mechanism that adjusts the position of the barycenter G of the energy storage 20, thus allowing an improvement in the barycenter balance the flight vehicle 100.

The present invention has been described by explaining the first to fifth embodiments. The present invention is, however, not limited to the above-described embodiments and can be implemented in various configurations, providing that such configurations do not depart from the substance of the present invention. For example, the energy storage 20 may have a different shape, such as a spherical shape or a slender tank shape. When a plurality of energy storages 20 are provided, not all of the energy storages 20 but some of them may be disposed above the semiconductor element 11 in the vertical direction 70.

A rotation mechanism may be provided so that in adjustment to a tilt of the energy storages 20, the semiconductor element 11 of the power converter 10 is disposed such that the plane 11*a* with the largest area is parallel to the vertical direction 70. Hence the influence of high-intensity neutron beams on the semiconductor element 11 can be reduced to the minimum.

What is claimed is:

1. A power conversion system incorporated in a flight vehicle, the power conversion system comprising:
- a module having a semiconductor element stored therein,
- wherein an energy storage is disposed above the module in a vertical direction, the energy storage storing a solid or liquid energy source containing a neutron attenuating material, and
- wherein at least either the module or the energy storage is provided with a movable mechanism that moves to shift in position according to a tilt of the flight vehicle,
- wherein the movable mechanism includes:
- a first slider rail attached to a lower surface of the energy storage;
- a second slider rail attached to a lower portion of the first slider rail; and
- a slider movable unit is attached to a lower portion of the second slider rail, and
- wherein the module is attached to a lower portion of the slider movable unit.

2. The power conversion system according to claim 1, wherein a shock-absorber is disposed between the energy storage and the module.

3. The power conversion system according to claim 2, wherein the shock-absorber has a ventilation function.

4. The power conversion system according to claim 1, comprising an adjustment mechanism that adjusts a barycenter of the energy storage.

5. The power conversion system according to claim 4, wherein the adjustment mechanism causes the energy storage to tilt at various angles.

6. The power conversion system according to claim 1, wherein a neutron attenuating material reduces intensity of neutrons carrying an energy of 1 MeV<E<20 MeV.

7. The power conversion system according to claim 1, wherein the energy storage is provided as at least one of a lithium ion battery, a fuel tank, and a fuel cell.

8. The power conversion system according to claim 1, wherein the semiconductor element is disposed such that a plane thereof with a largest area is parallel to a vertical direction.

9. A flight vehicle comprising:
- a main body;
- a propulsion device that generates a propulsive force for allowing the main body to fly; and
- the power conversion system incorporated in the main body, the power conversion system being set forth in claim 1.

* * * * *